United States Patent
Patwardhan et al.

(10) Patent No.: US 8,954,435 B2
(45) Date of Patent: Feb. 10, 2015

(54) METHOD AND SYSTEM FOR RECLAIMING STORAGE ON A SHARED STORAGE DEVICE OR INDEPENDENT OF THE MOUNT STATE OF A FILE SYSTEM

(75) Inventors: Kedar Shrikrishna Patwardhan, Maharashtra (IN); Anirban Mukherjee, Maharashtra (IN); Kirubakaran Kaliannan, Beaverton, OR (US)

(73) Assignee: Symantec Corporation, Mountain View, CA (US)

( * ) Notice: Subject to any disclaimer, the term of this patent is extended or adjusted under 35 U.S.C. 154(b) by 219 days.

(21) Appl. No.: 13/092,832

(22) Filed: Apr. 22, 2011

(65) Prior Publication Data
US 2012/0271870 A1 Oct. 25, 2012

(51) Int. Cl.
*G06F 17/30* (2006.01)
*G06F 17/00* (2006.01)

(52) U.S. Cl.
CPC ...... *G06F 17/3007* (2013.01); *G06F 17/30283* (2013.01)
USPC ........... 707/737; 707/770; 707/827; 711/112; 711/114; 711/156; 711/166; 711/170; 711/202; 711/205; 711/206

(58) Field of Classification Search
USPC .......... 707/737, 770, 827; 711/112, 114, 170, 711/202, 156, 166, 206, 205
See application file for complete search history.

(56) References Cited

U.S. PATENT DOCUMENTS

| | | | |
|---|---|---|---|
| 6,128,715 A | 10/2000 | Wang et al. | |
| 6,314,501 B1 | 11/2001 | Gulick et al. | |
| 7,353,350 B2 | 4/2008 | Klassen et al. | |
| 7,603,532 B2 * | 10/2009 | Rajan et al. | 711/166 |
| 7,631,155 B1 * | 12/2009 | Bono et al. | 711/156 |
| 7,653,832 B2 | 1/2010 | Faibish et al. | |
| 7,676,704 B2 | 3/2010 | Hong et al. | |
| 7,694,082 B2 | 4/2010 | Golding et al. | |
| 7,822,939 B1 | 10/2010 | Veprinsky et al. | |
| 7,941,709 B1 | 5/2011 | Hong et al. | |
| 8,438,362 B2 | 5/2013 | Mukherjee et al. | |
| 2008/0189498 A1 | 8/2008 | Brown | |
| 2010/0049735 A1 | 2/2010 | Hsu | |
| 2010/0191908 A1 | 7/2010 | Yamakawa | |
| 2011/0010495 A1 | 1/2011 | Haustein et al. | |
| 2012/0054746 A1 | 3/2012 | Vaghani et al. | |
| 2012/0198443 A1 | 8/2012 | Tatavarty | |

(Continued)

OTHER PUBLICATIONS

Schreuder (Accessing file on Unmounted File systems). Dec. 2-7, 2001.*

*Primary Examiner* — Yicun Wu
(74) *Attorney, Agent, or Firm* — Wilmer Cutler Pickering Hale and Dorr LLP

(57) ABSTRACT

A method for storage reclamation in a shared storage device. The method includes executing a distributed computer system having a plurality of file systems accessing storage on a shared storage device, and initiating a reclamation operation by using a reclamation agent that accesses the shared storage device. The method further includes reading the file system data structure that represent unallocated storage blocks of one of the plurality of file systems that will undergo a reclamation operation. A plurality of I/O resources that are used to provide I/O to the unallocated storage blocks are then interrupted. Storage from the unallocated storage blocks is then reclaimed, and normal operation of the I/O resources that are used to provide I/O to the unallocated storage blocks is resumed.

20 Claims, 9 Drawing Sheets

(56) References Cited

U.S. PATENT DOCUMENTS

2012/0260050 A1 10/2012 Kaliannan
2012/0278580 A1 11/2012 Malige et al.
2012/0311291 A1 12/2012 Fiske et al.
2013/0073914 A1 3/2013 Kaul et al.

* cited by examiner

METHOD AND SYSTEM FOR RECLAIMING STORAGE ON A SHARED STORAGE DEVICE OR INDEPENDENT OF THE MOUNT STATE OF A FILE SYSTEM

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

Many distributed computer systems utilize a centralized shared storage system for their provisioning. Thin provisioning is a mechanism that applies to large-scale centralized computer disk storage systems, SANs, and storage virtualization systems. Thin provisioning allows space to be easily allocated to servers, on a just-enough and just-in-time basis.

Thin Provisioning, in distributed computing system using a shared storage environment, is a method for optimizing utilization of available storage. It relies on on-demand allocation of blocks of data versus the traditional method of allocating all the blocks up front. This methodology eliminates almost all whitespace which helps avoid the poor utilization rates, often as low as 10%, that occur in the traditional storage allocation method where large pools of storage capacity are allocated to individual servers but remain unused (not written to). This traditional model is often called "fat" or "thick" provisioning.

With thin provisioning, storage capacity utilization efficiency can be automatically driven up towards 100% with very little administrative overhead. Organizations can purchase less storage capacity up front, defer storage capacity upgrades in line with actual business usage, and save the operating costs (electricity and floor space) associated with keeping unused disk capacity spinning.

Previous systems generally required large amounts of storage to be physically pre-allocated because of the complexity and impact of growing volume (LUN) space. Thin provisioning enables over-allocation or over-subscription.

A volume manager is often used to manage large-scale centralized computer storage systems. However, problems exist where, in such systems, the thinly provisioned array and the volumes can have a very large number of file systems, where any volume can have any file system on it. Not being able to reclaim unused storage from the volume manager would require a customer to install/use specific services for each file system to be able to reclaim storage. Instead if the volume manager could reclaim unused storage of just about any file system, there would be just one method exposed by the volume manager.

SUMMARY OF THE INVENTION

A method for storage reclamation in a thinly provisioned storage device. The method includes executing a distributed computer system having a plurality of file systems accessing storage on a shared storage device, and initiating a reclamation operation by using a reclamation agent that accesses the shared storage device. The method further includes reading the file system data structure that represent unallocated storage blocks of one of the plurality of file systems that will undergo a reclamation operation. A plurality of I/O resources that are used to provide I/O to the unallocated storage blocks are then interrupted. Storage from the unallocated storage blocks is then reclaimed, and normal operation of the I/O resources that are used to provide I/O to the unallocated storage blocks is resumed.

In one embodiment, the plurality of I/O resources that are used to provide I/O to the unallocated storage blocks comprise a plurality of I/O buffers.

In one embodiment, a volume manager is used to control the plurality of I/O buffers.

In one embodiment, at least one I/O buffer range is locked in order to prevent access to at least one unallocated storage block that corresponds to the I/O buffer.

In one embodiment, the shared storage device comprises a disk array.

In one embodiment, subsequent to the interruption of I/O resources, a verification process is performed to ensure the unallocated storage blocks are in fact still unallocated.

In one embodiment, upon a determination that the unallocated storage blocks are incorrectly deemed to be unallocated, re-reading the file system data structure that represent unallocated storage blocks of one of the plurality of file systems that will undergo a reclamation operation, and re-interrupting the plurality of I/O resources that are used to provide I/O to the unallocated storage blocks.

In one embodiment, the reclamation operation proceeds regardless of a mount state of a file system that accesses the unallocated storage blocks.

In one embodiment, the present invention is implemented as a Computer readable storage medium having stored thereon, computer executable instructions that, if executed by a computer system cause the computer system to perform a method for storage reclamation in a shared storage device. The method includes executing a distributed computer system having a plurality of file systems accessing storage on a shared storage device, and initiating a reclamation operation by using a reclamation agent that accesses the shared storage device. The method further includes reading the file system data structure that represent unallocated storage blocks of one of the plurality of file systems that will undergo a reclamation operation. A plurality of I/O resources that are used to provide I/O to the unallocated storage blocks are then interrupted. Storage from the unallocated storage blocks is then reclaimed, and normal operation of the I/O resources that are used to provide I/O to the unallocated storage blocks is resumed.

In one embodiment, the present invention is implemented as a Method for storage reclamation in a shared storage device. The method includes executing a distributed computer system having a plurality of file systems accessing storage on a shared storage device, and initiating a reclamation operation by using a reclamation agent that accesses the shared storage device. The method can but not necessarily includes unmounting a file system from a volume of the shared storage device, and changing the volume to become read-only. The method further includes reading the file system data structure that represent unallocated storage blocks of the file system, reclaiming storage from the unallocated storage blocks, changing the volume to become read write, and making the volume available for file system operations.

In one embodiment, the shared storage device comprises a disk array.

In one embodiment, the distributed computer system is a high availability distributed computer system.

In one embodiment, the distributed computer system is a clustered computer system that uses the shared storage device.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
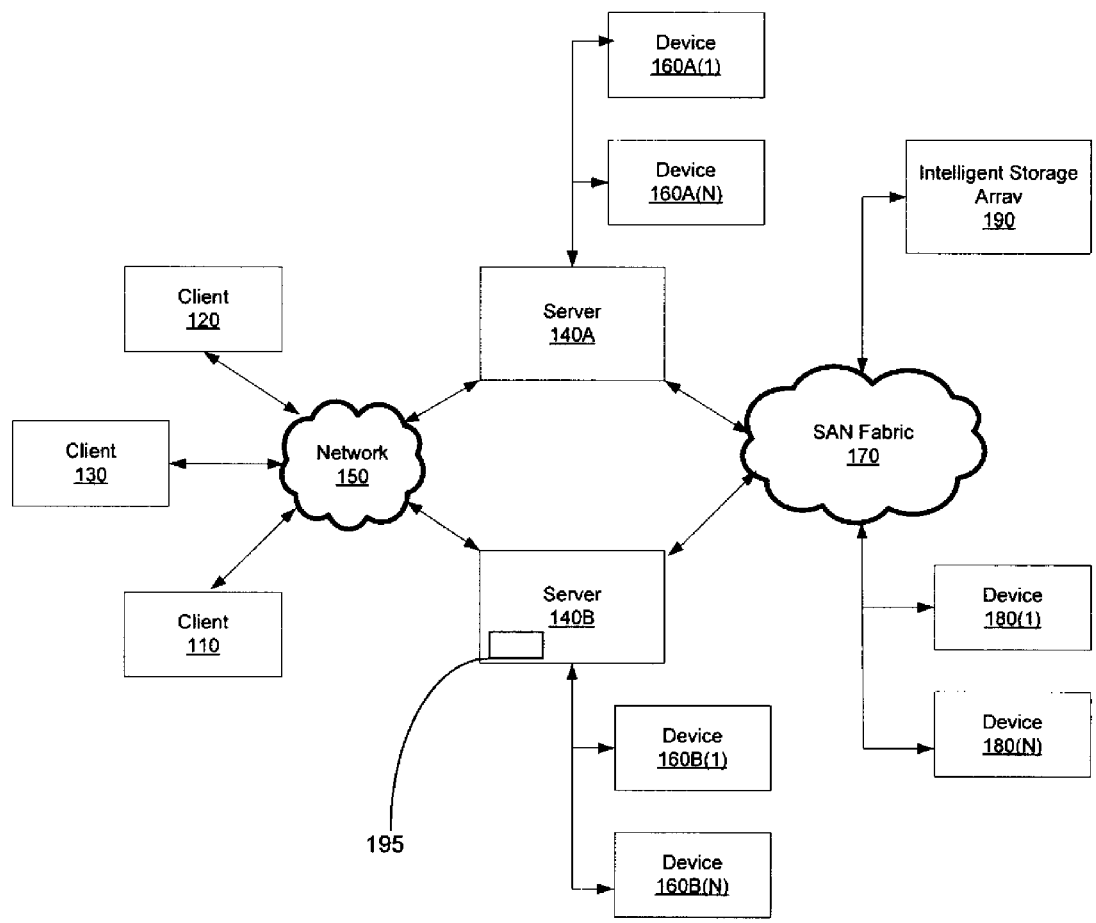
FIG. 1 shows a diagram depicting a network architecture of a client server based computing system in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present invention. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a reclamation agent 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
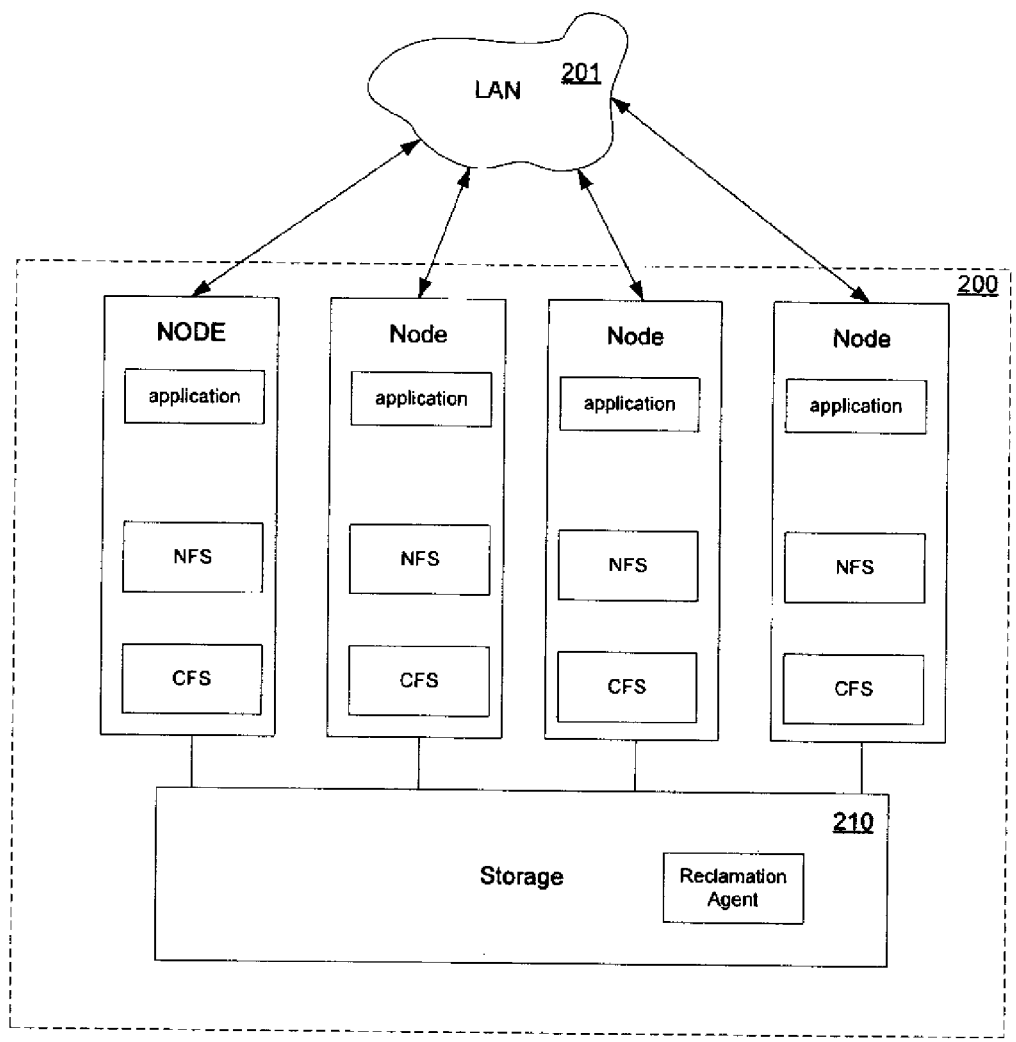
FIG. 2 shows a diagram depicting an exemplary high availability cluster-based computing system in accordance with one embodiment of the present invention.

FIG. 2 shows a diagram depicting an exemplary high availability cluster-based computing system 200 in accordance with one embodiment of the present invention. As illustrated in FIG. 2, 4 nodes are shown coupled to a common storage device 210. In one embodiment, the nodes on each host are an instantiation comprising an application, a network file system (NFS) and a cluster file system (CFS). Hence, the computer system 200 comprises a four node cluster. Each of the constituent nodes is shown connected to the storage device 210. The nodes of the cluster communicate with one another via the local area network 201. These local area networks can in turn be connected to one or more wide area networks (e.g., the Internet). Although the embodiment is described in the context of a cluster, it should be appreciated that embodiments of the present invention can readily scale and function in distributed computer systems and/or cloud based computer systems having hundreds or thousands of nodes.

FIG. 2 shows the manner in which the common storage device can support the mounting and dismounting of the various file systems to which it provides data storage services. The storage device 210 is typically equipped to provide high availability and redundancy while maintaining flexibility of the storage services provided to the various file systems. The storage device 210 includes a reclamation agent that functions by providing storage space reclamation from provisioned space provided to the mounted file systems.

Figure 3:
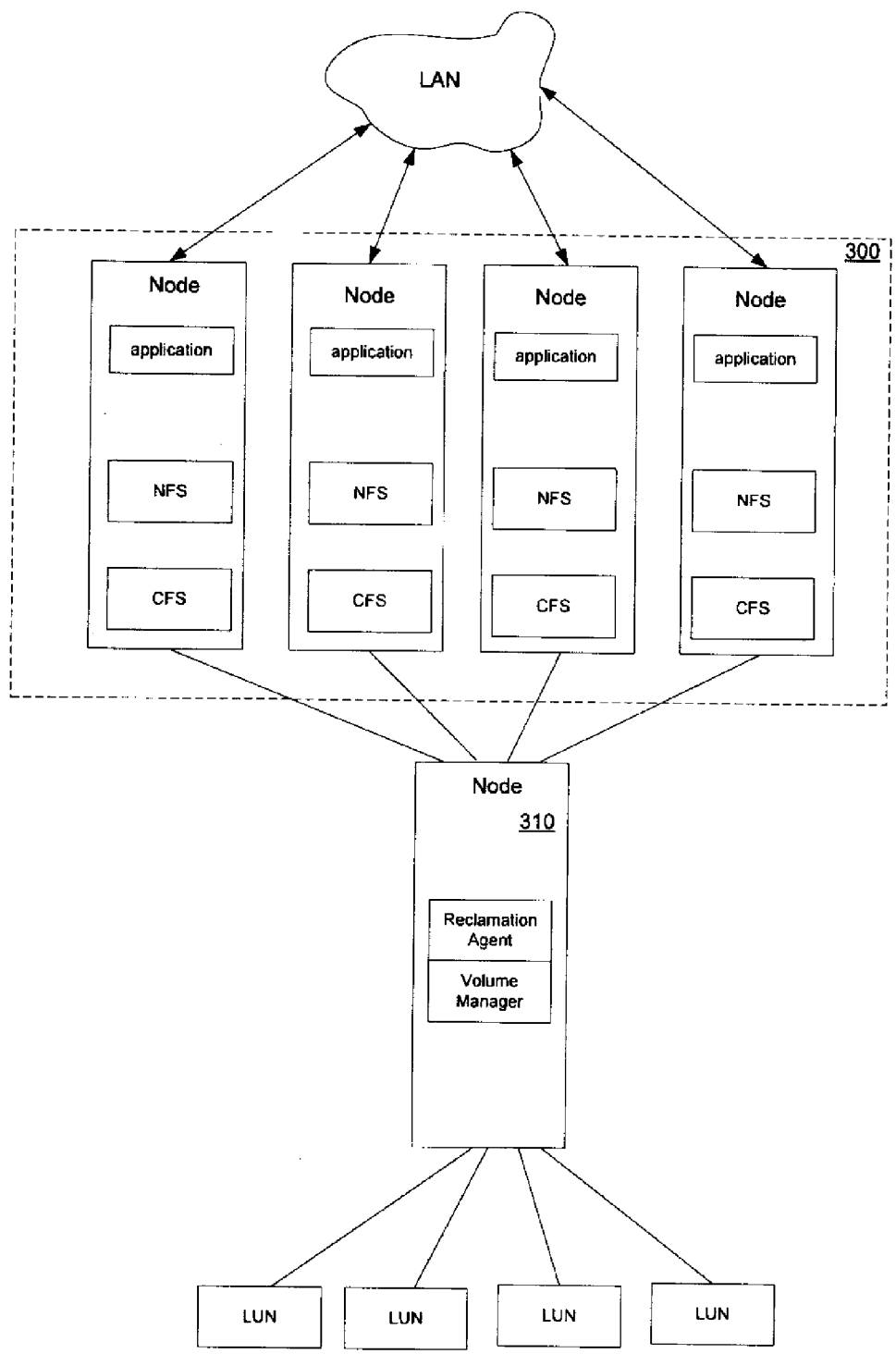
FIG. 3 shows a first exemplary implementation of a storage device in accordance with one embodiment of the present invention.

FIG. 3 shows a first exemplary implementation of a storage device in accordance with one embodiment of the present invention. As depicted in FIG. 3, the 4 nodes of the cluster 300 are coupled to node 310 which hosts a volume manager and the reclamation agent. The volume manager functions with a plurality of coupled LUNs (e.g., disk drives, solid-state drives, or the like) to provide volumes (e.g., data storage) which can be used to mount the plurality of network file systems and cluster file systems.

Figure 4:
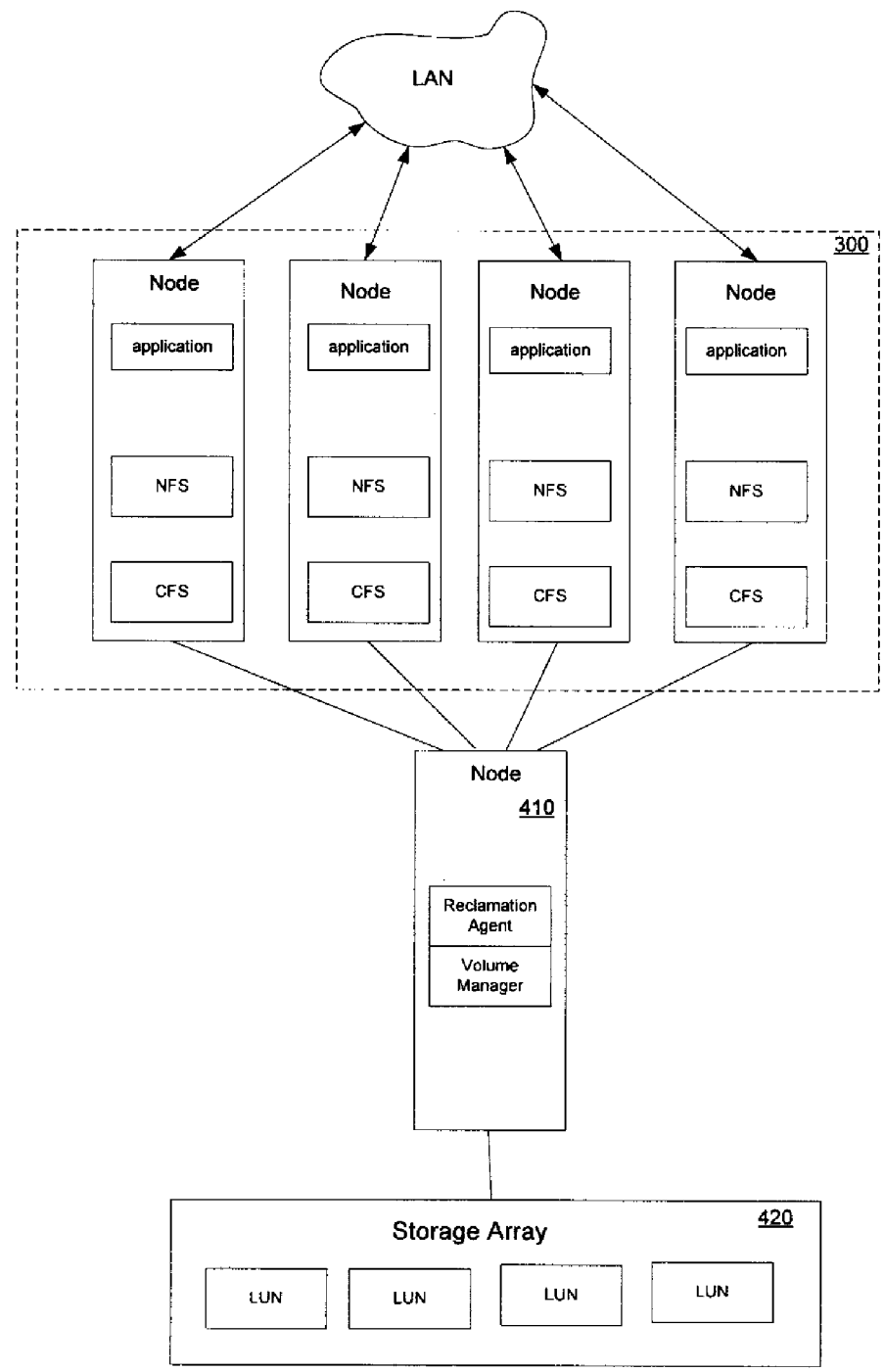
FIG. 4 shows a second exemplary implementation of a storage device in accordance with one embodiment of the present invention.

FIG. 4 shows a second exemplary implementation of a storage device in accordance with one embodiment of the present invention. As depicted in FIG. 4, the 4 nodes of the cluster 300 are coupled to a node 410 which hosts a volume manager and the reclamation agent. However, in the FIG. 4 embodiment, the volume manager functions with a plurality of LUNs that are created by a storage array 420. The storage array 420 is used to provide LUNs which can be used to mount the plurality of network file systems and cluster file systems.

Referring still to FIG. 4, the reclamation agent includes functionality that is designed to allow the use of a mapping service that can identify used blocks of a file system to reclaim storage of one or more of the file systems without any regard to, and irrespective of, the file system mount state. The file system mount state refers to the difference is between whether a given file system is currently mounted, is being mounted, is currently unmounted, or changing state between the two. The reclamation agent can provide this functionality without requiring any specific service (e.g., a reclaim service) from the file system. However, it should be noted that the reclamation agent can take advantage of any reclamation service that may be offered by one or more of the file systems.

Hence, embodiments of the present invention provide a number of advantages when it comes to provisioning storage for multiple file systems. The ability to reclaim storage space from provisioned file systems greatly enhances resource utilization in a thin provisioned environment. Embodiments of the present invention provide functionality that enables the reclamation of storage from any provisioned file system without any cooperation from the file system and without intervening complications regarding whether the said file system is mounted, unmounted, or changing states in between.

Figure 5:
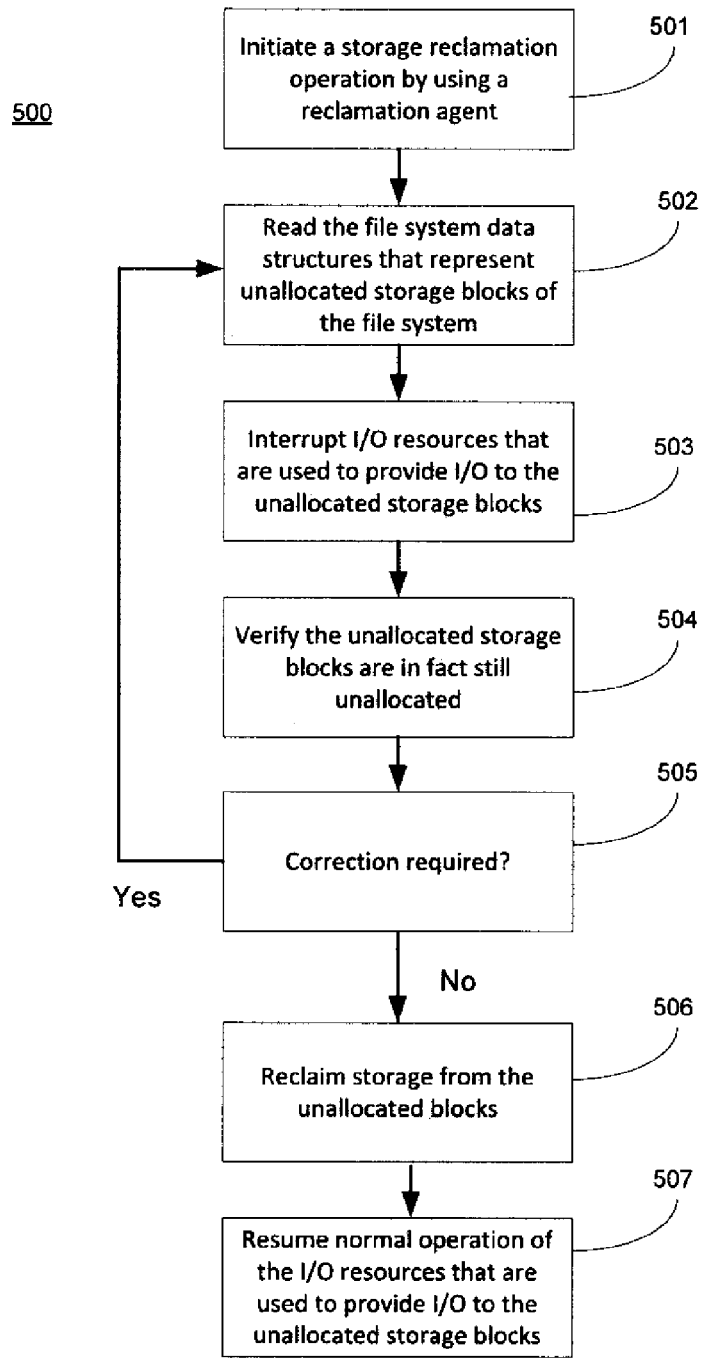
FIG. 5 shows a flowchart of the steps of a process for reclaiming storage from a provisioned file system in accordance with one embodiment of the present invention.

FIG. 5 shows a flowchart of the steps of a process 500 for reclaiming storage from a provisioned file system in accordance with one embodiment of the present invention.

Process 500 begins in step 501, where a storage reclamation operation is initiated by using a reclamation agent (e.g., reclamation agent 210 shown in FIG. 2). As described above, the provisioned file system is typically part of a thinly provisioned storage array as implemented by, for example, the storage array 420 of FIG. 4. Upon initiation of a reclamation operation, the reclamation agent would first gain access to the file system layout. In one embodiment, this access to the file system layout is obtained via a mapping service. This mapping service can be provided by the reclamation agent, the volume manager, or the like.

In step 502, the reclamation agent reads the file system data structures and identifies those data structures that represent the unallocated storage blocks of the file system.

In step 503, the reclamation agent can then interrupt I/O resources that are used to provide I/O to the unallocated storage blocks. In one embodiment, this interruption is implemented via its interaction with a volume manager to lock one or more I/O buffers that are used to provide I/O to the unallocated storage blocks. In one embodiment, the I/O buffers are certain memory addresses in system memory of the node. The objective of interruption, however, is to prevent file system access to the unallocated storage blocks.

In step 504, the reclamation agent can verify whether the unallocated storage blocks are in fact still unallocated. This verification can identify those situations where the file system may have touched one or more of the unallocated storage blocks prior to completion of the interruption.

In step 505, if correction is required (e.g., alteration since the initiation of the interrupt process), process 500 proceeds back to step 502, where it re-reads the file system data structures and determines those data structures that represent unallocated storage blocks of the file system. In step 505, if correction is not required, process 500 proceeds to step 506.

In step 506, storage is reclaimed from the unallocated blocks.

Hence, in step 507, the reclamation agent can release the interruption, and resume normal operation of the I/O resources that are used provide I/O to the unallocated storage blocks.

Figure 6:
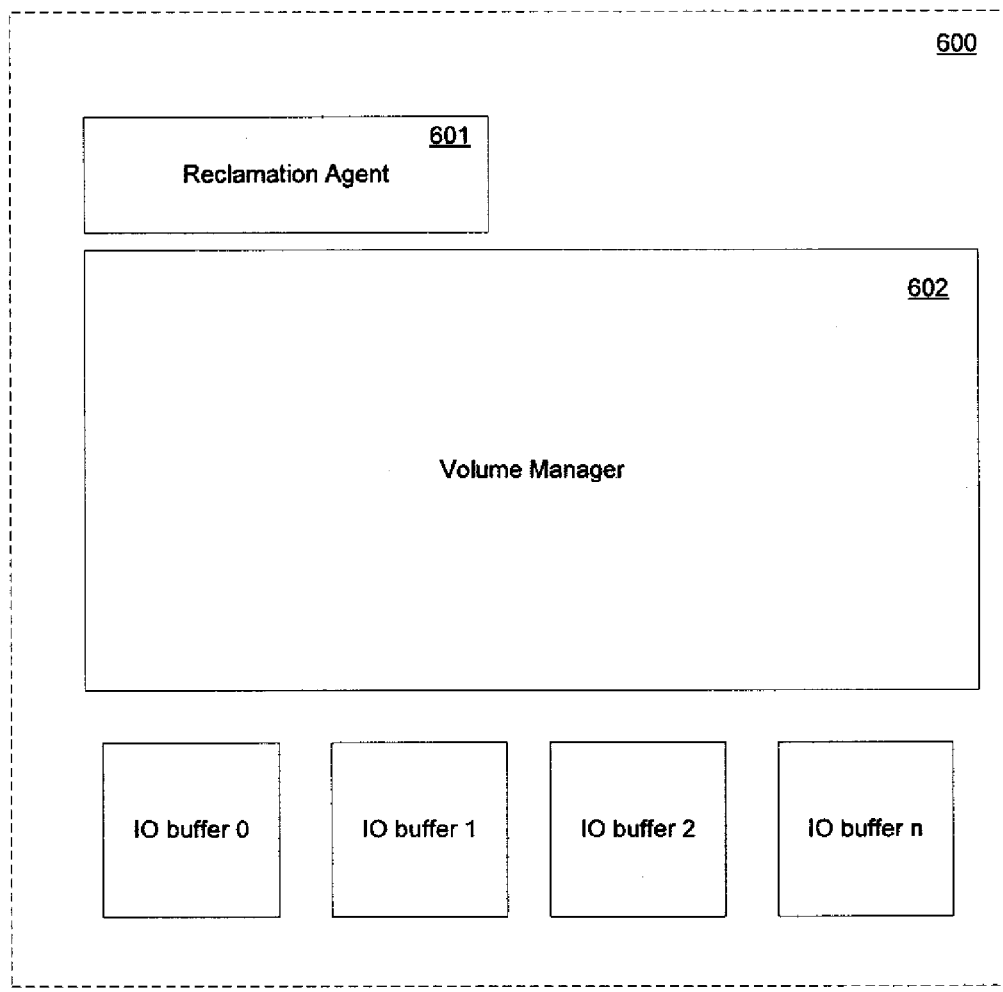
FIG. 6 shows a diagram depicting instantiated software components that implement reclamation functionality in accordance with one embodiment of the present invention.

FIG. 6 shows a diagram depicting instantiated software components 600 that implement reclamation functionality in accordance with one embodiment of the present invention. As depicted in FIG. 6, the instantiated software components include a reclamation agent 601, a volume manager 602 and a plurality of I/O buffers.

It should be noted that, in one embodiment, interrupting I/O by locking I/O buffer range effectively prevents a file system from modifying data in the locked buffer range since the read/write of those blocks requires a lock (e.g., from a lock manager) on the buffer ranges which cannot be granted until the reclamation agent requests the I/O buffer ranges to be unlocked. In this manner, the locked buffer ranges serialize any allocation of free blocks of the file system should the file system become mounted during reclaim operation, or whether one of the file systems already mounted was in the process of allocating/freeing storage as part of file system activity. Furthermore, process 500 allows a reclamation operation to reclaim storage even from those file systems that do not expose any reclamation services or reclamation APIs.

Figure 7:
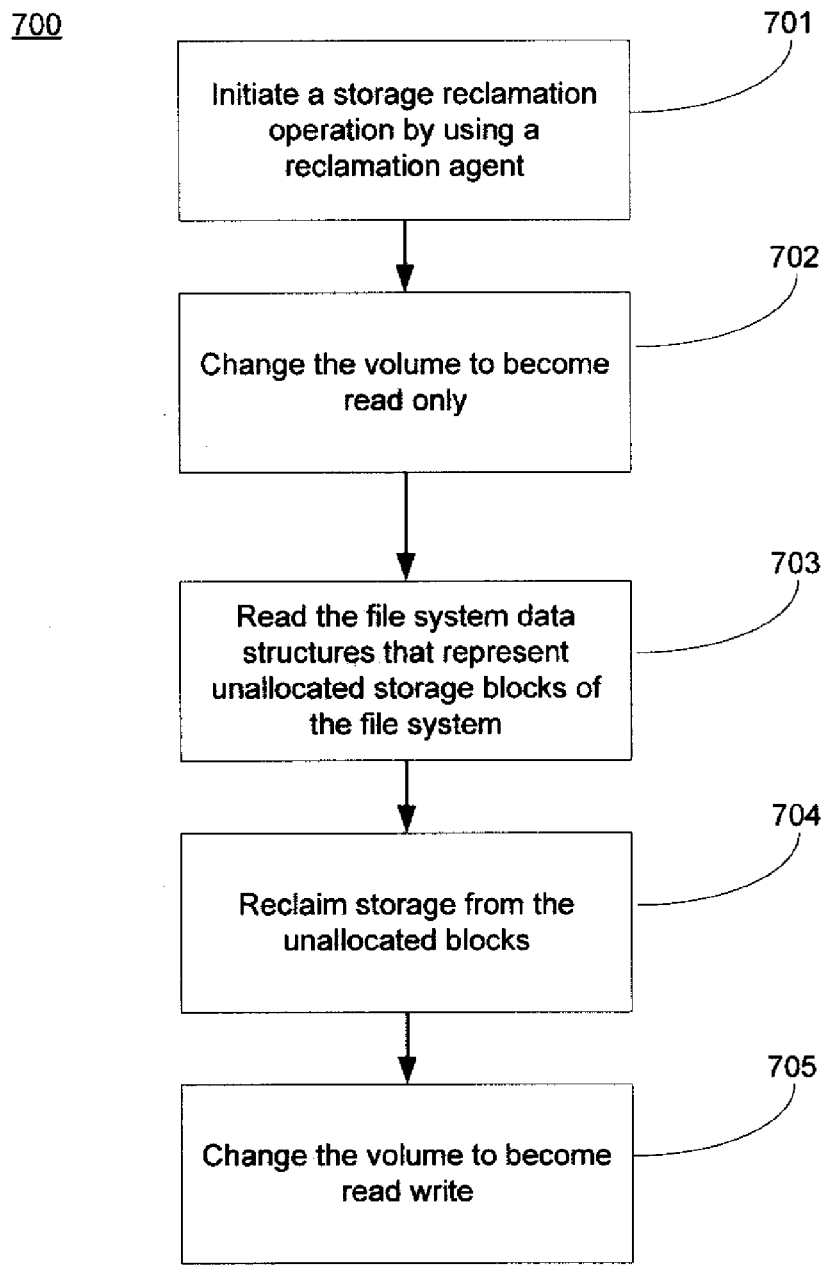
FIG. 7 shows a flowchart of the steps of a process for reclaiming storage from a provisioned file system in accordance with one alternative embodiment of the present invention.

FIG. 7 shows a flowchart of the steps of a process 700 for reclaiming storage from a provisioned file system in accordance with one alternative embodiment of the present invention.

Process 700 of FIG. 7 describes an alternative storage reclamation process in comparison to process 500 of FIG. 5. For example, process 500 is able to perform reclamation processing regardless of the mount state of a given file system. In contrast, process 700 is able to perform reclamation processing when a file system is in an unmounted state, but cannot perform revocation processing when a file system is mounted. The reduced functionality of process 700 is a trade off for a more streamlined implementation. For example, a reclamation agent compatible with process 700 does not require I/O interruption interaction with the volume manager when performing storage reclamation processing.

Process 700 begins in step 701, where a storage reclamation operation is initiated by using a reclamation agent.

In step 702, the volume is now changed to become read-only.

In step 703, the file system data structures that represent the unallocated storage blocks of the file system are now read.

In step 704, the storage from the unallocated blocks is now reclaimed.

And subsequently, in step 705, the volume is changed to become read write.

Hence, a reclamation agent compatible with process 700 does not require I/O interruption interaction with the volume manager when performing storage reclamation processing. Once the file system data structures of the unallocated storage blocks are read, the storage reclamation process can proceed without worry of interruption.

Figure 8:
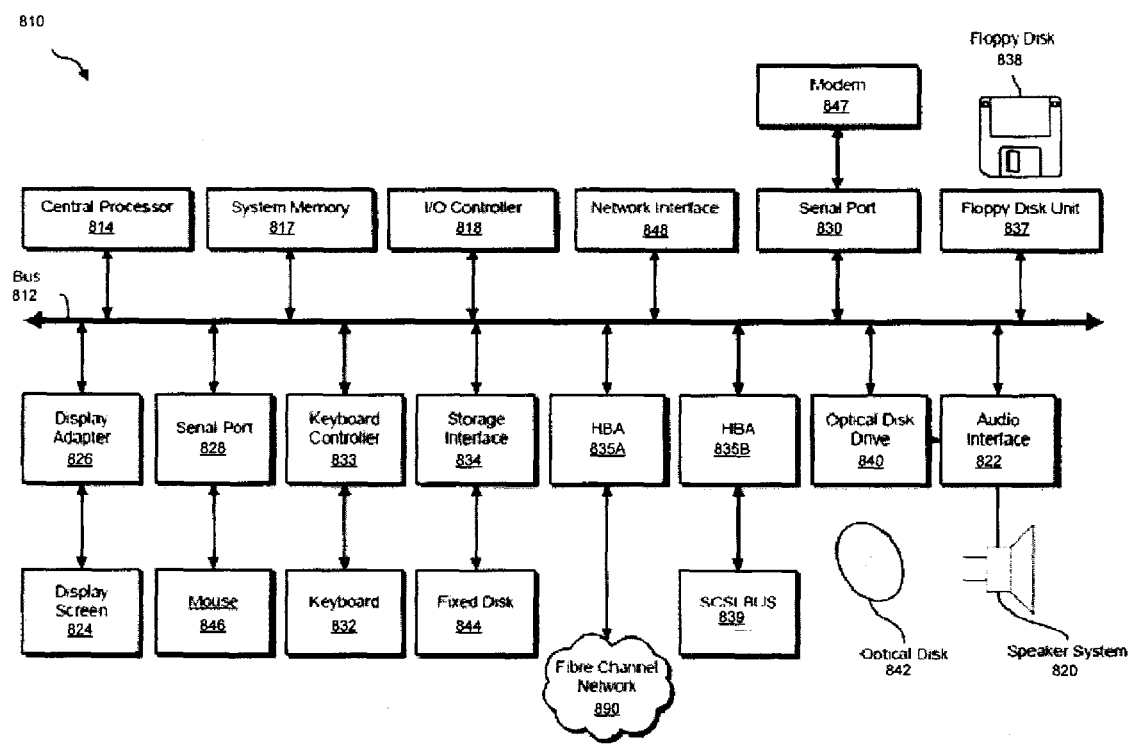
FIG. 8 depicts a block diagram of a computer system suitable for implementing certain functionality in accordance with one embodiment of the present invention.

FIG. 8 depicts a block diagram of a computer system 810 suitable for implementing certain functionality in accordance with one embodiment of the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fiber Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. In the FIG. 8 embodiment, the system memory 817 instantiates a reclamation manager module 850 which implements the continuous reclamation functionality described above. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
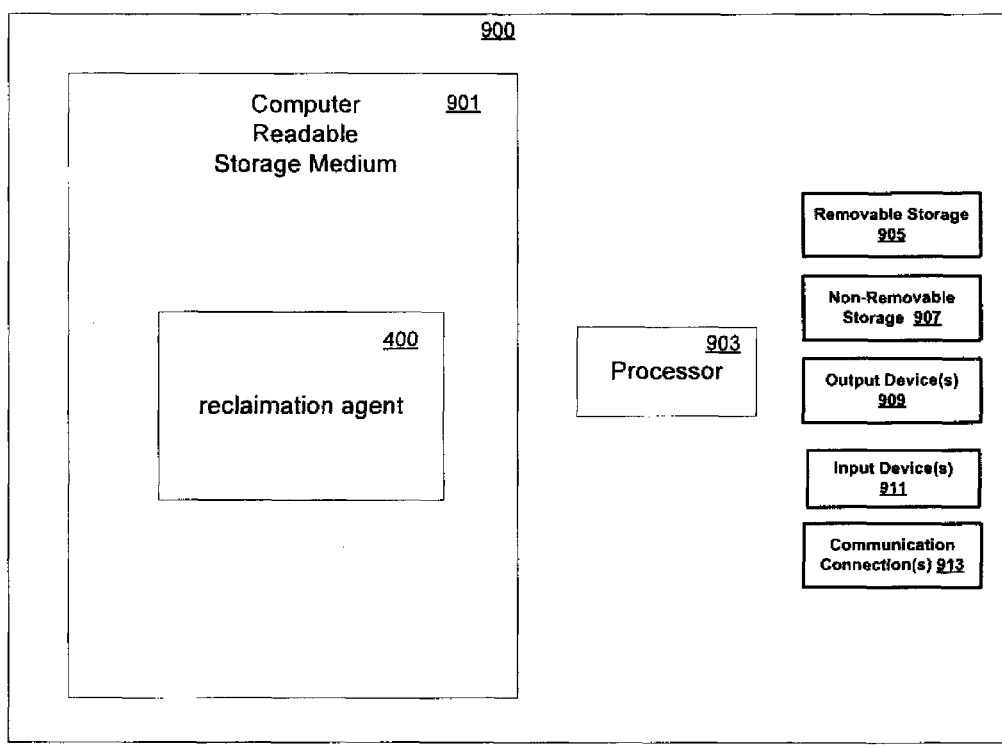
FIG. 9 shows an exemplary computer system according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the one or more software agents (e.g., reclamation agent 400 from FIG. 4) are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as DRAM, etc.) 901*a*, non-volatile 901*b* (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for storage reclamation in a storage device, comprising:
    executing a distributed computer system having a plurality of file systems accessing storage on a shared storage device;
    initiating a reclamation operation by using a reclamation agent that accesses the shared storage device;
    reading a file system data structure to identify unallocated storage blocks of one of the plurality of file systems that will undergo a reclamation operation;
    interrupting a plurality of I/O resources that implement I/O to the identified unallocated storage blocks;
    determining whether the identified unallocated storage blocks were allocated during a time period in which the plurality of I/O resources were being interrupted;
    reclaiming storage from the identified unallocated storage blocks that were determined to not be allocated while the plurality of I/O resources were being interrupted; and
    resuming normal operation of the I/O resources that implement I/O to the unallocated storage blocks.

2. The method of claim 1, wherein the plurality of I/O resources that implement I/O to the unallocated storage blocks comprise a plurality of I/O buffers.

3. The method of claim 2, wherein a volume manager is used to control the plurality of I/O buffers.

4. The method of claim 2, wherein at least one I/O buffer range is locked in order to prevent access to at least one unallocated storage block that corresponds to the I/O buffer.

5. The method of claim 1, wherein the shared storage device comprises a local file system with a disk array.

6. The method of claim 1, wherein subsequent to the interruption of I/O resources, a verification process that comprises determining whether the identified unallocated storage blocks were allocated while the plurality of I/O resources were being interrupted is performed.

7. The method of claim 6, wherein upon a determination that the unallocated storage blocks have not remained unallocated while the plurality of I/O resources were being interrupted, re-reading the file system data structure that represent unallocated storage blocks of one of the plurality of file systems that will undergo the reclamation operation, and re-interrupting the plurality of I/O resources that implement I/O to the unallocated storage blocks.

8. The method of claim 1, wherein the reclamation operation proceeds regardless of a mount state of a file system that accesses the unallocated storage blocks.

9. A non-transitory computer readable storage medium having stored thereon, computer executable instructions that, when executed by a computer system, cause the computer system to perform a method comprising:
    executing a distributed computer system having a plurality of file systems accessing storage on a shared storage device;
    initiating a reclamation operation by using a reclamation agent that accesses the shared storage device;
    reading file system data structure to identify unallocated storage blocks of one of the plurality of file systems that will undergo a reclamation operation;

interrupting a plurality of I/O resources that implement I/O to the identified unallocated storage blocks;

determining whether the identified unallocated storage blocks were allocated during a time period in which the plurality of I/O resources were being interrupted;

reclaiming storage from the identified unallocated storage blocks that were determined to not be allocated while the plurality of I/O resources were being interrupted; and resuming normal operation of the I/O resources that implement I/O to the unallocated storage blocks.

10. The non-transitory computer readable storage medium of claim 9, wherein the plurality of I/O resources that implement I/O to the unallocated storage blocks comprise a plurality of I/O buffers.

11. The non-transitory computer readable storage medium of claim 10, wherein a volume manager is used to control the plurality of I/O buffers.

12. The non-transitory computer readable storage medium of claim 10, wherein at least one I/O buffer range is locked in order to prevent access to at least one unallocated storage block that corresponds to the I/O buffer.

13. The non-transitory computer readable storage medium of claim 9, wherein the shared storage device comprises a local file system with a disk array.

14. The non-transitory computer readable storage medium of claim 9, wherein subsequent to the interruption of I/O resources, a verification process that comprises determining whether the identified unallocated storage blocks were allocated while the plurality of I/O resources were being interrupted is performed to determine whether the unallocated storage blocks remain unallocated.

15. The non-transitory computer readable storage medium of claim 14, wherein upon a determination that the unallocated storage blocks have not remained unallocated while the plurality of I/O resources were being interrupted, re-reading the file system data structure that represent unallocated storage blocks of one of the plurality of file systems that will undergo the reclamation operation, and re-interrupting the plurality of I/O resources that implement I/O to the unallocated storage blocks.

16. The non-transitory computer readable storage medium of claim 9, wherein the reclamation operation proceeds regardless of a mount state of a file system that accesses the unallocated storage blocks.

17. A method for storage reclamation in a shared storage device, comprising:

executing a distributed computer system having a plurality of file systems accessing storage on a shared storage device;

initiating a reclamation operation by using a reclamation agent that accesses the shared storage device;

changing a volume from a first state to a read-only state;

reading a file system data structure that represents unallocated storage blocks of the file system when the volume is in the read-only state, wherein the file system is in an unmounted state;

reclaiming storage from the unallocated storage blocks, wherein a plurality of I/O resources that implement I/O to the unallocated storage blocks and remain in an uninterrupted state during the reclaiming;

changing the volume from the read-only state to a readable and writable state; and making the volume available for file system operations.

18. The method of claim 17, wherein the shared storage device comprises a local file system with a disk array.

19. The method of claim 17, wherein the distributed computer system is a high availability distributed computer system.

20. The method of claim 17, wherein the distributed computer system is a clustered computer system that uses the shared storage device.

* * * * *